April 19, 1927.
P. TOWNS
1,625,292
QUICK ADJUSTING FENDER OR SHIELD LIFTER ATTACHMENT FOR CULTIVATORS
Filed May 5, 1926
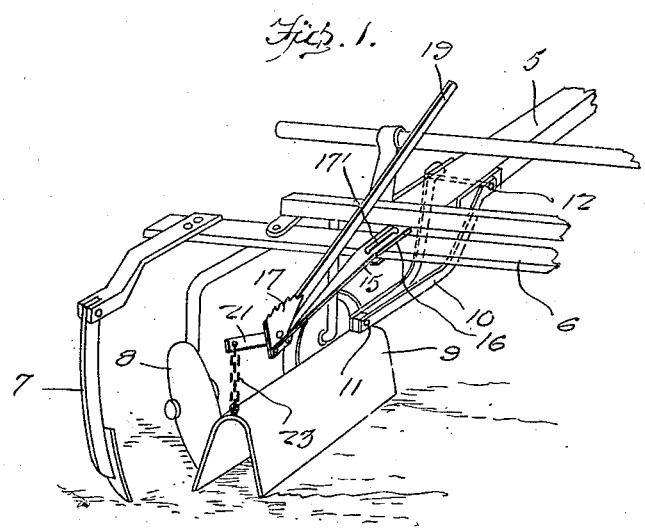
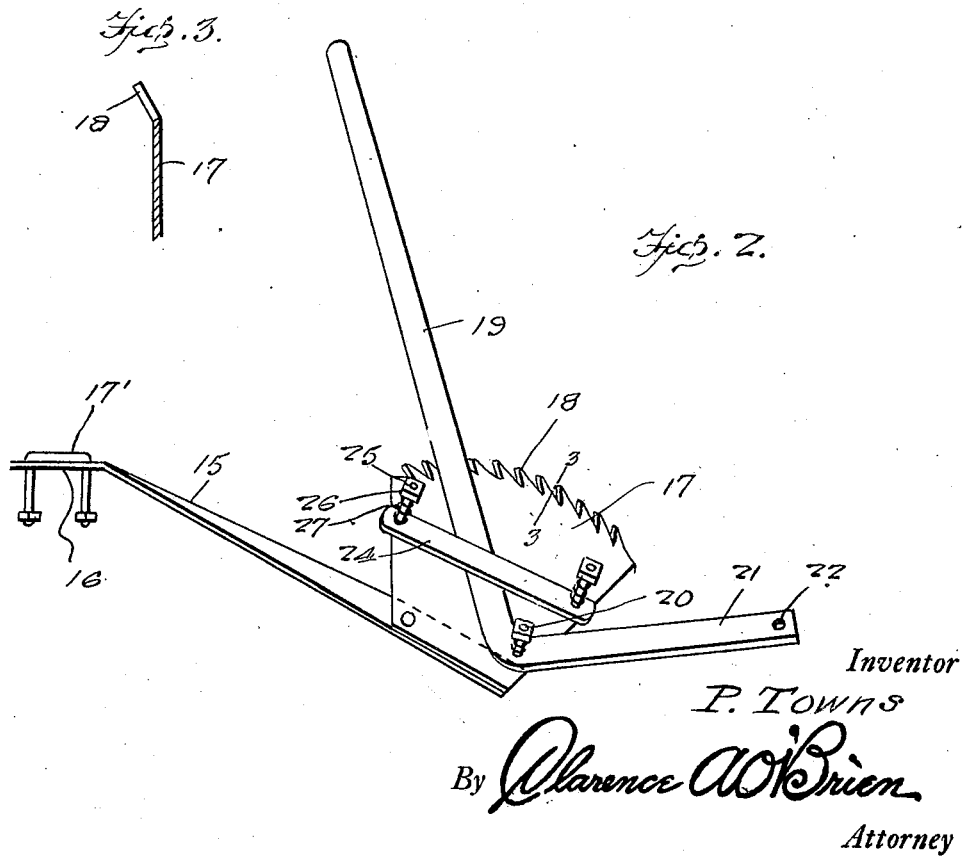
Inventor
P. Towns
By Clarence A. O'Brien
Attorney Patented Apr. 19, 1927.

1,625,292

UNITED STATES PATENT OFFICE.

PETE TOWNS, OF ANSLEY, NEBRASKA.

QUICK-ADJUSTING FENDER OR SHIELD LIFTER ATTACHMENT FOR CULTIVATORS.

Application filed May 5, 1926. Serial No. 106,895.

The present invention relates to an attachment for cultivators and has for its principal object to provide means for raising and lowering the fender or shield which is attached to the cultivator for preventing young crops from being entirely covered up by the soil thrown toward them during cultivation.

Another important object of the invention resides in the provision of an attachment of this nature which may be mounted with considerable ease on numerous well known cultivators now on the market, for the purpose of providing an adjustment for the fender or shield.

A still further very important object of the invention lies in the provision of an attachment of this nature which is exceedingly simple in its construction, compact, inexpensive to manufacture, strong, durable, thoroughly reliable, convenient to operate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a fragmentary perspective view of a cultivator showing my attachment associated therewith, Fig. 2 is a detail perspective view of the attachment, per se, and Fig. 3 is a detail section through a plate forming part of the attachment taken substantially on the line 3—3 of Fig. 2.

Referring to the drawing in detail, it will be seen that I have illustrated a portion of a conventional well known type of cultivator for the purpose of bringing out clearly the utility and operation of my attachment. This cultivator includes among other elements, a tongue 5 and a cross beam 6 on which is supported the usual cultivating elements 7 and 8. It is a common practice to mount a fender or shield of a substantially inverted U-shaped formation in end elevation on bracket arms 10 of a pivot 11, these bracket arms 10 having their forward ends bent upwardly and engaged as at 12 with the tongue 5. Thus far the structure described is conventional and does not form part of the attachment per se, but functions in combination therewith.

Referring now in detail to the attachment, it will be seen that 15 denotes the body of a bracket arm which is twisted so that the transverse dimension of one end is disposed substantially at right angles to the transverse dimension of the other end. The other end of the bracket arm 15 has a terminal extension 16 extending at an obtuse angle to the longitudinal dimension of the arm itself. A U-bolt 17 pierces openings in the extension 16 so that it may be attached to the cross beam 6 and thus the arm 15 will extend from the cross beam rearwardly and incline downwardly. On the lower end of the arm 15, a plate 17 is fixed so as to be disposed in a substantial vertical plane. The upper edge of this plate 15 is arcuate in formation and provided with teeth 18. A bell crank lever 19 has its intermediate portion pierced by a bolt 20 extending from the lower portion of the plate 17, so as to be pivotally mounted. The short arm 21 of the bell crank lever is provided with an aperture 22 to be engaged by a chain 23 the other end of which is engaged with the rear end of the fender or shield 9.

It will thus be seen that by rocking the lever 19, the fender or shield may be raised or lowered as may be desired, depending upon the height of the crop to be guarded thereby, during the cultivation. A guide bar 24 is pierced at its ends by bolts 25 extending from the plate 17, and nuts 26 are on these bolts. Springs 27 are mounted about the bolts to impinge against the guide bar 24 and the nuts 26, thereby holding the lever 19 in close proximity to the plate 17. Owing to the fact that the teeth 18 are bent over toward the lever as is clearly shown in Fig. 3, it will be seen that after the lever has been adjusted to raise the fender or shield, it will be maintained in adjusted position through the intermediacy of the bar 24 and spring 27.

It is thought that the construction, operation, utility, and advantages of this invention will now be quite apparent without a more detailed description thereof. The present embodiment of the invention has been disclosed in detail, since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

In a cultivator; wherein the cultivator includes a frame and a pivotally mounted fender; a bracket arm twisted throughout its length and having an extension at one end fixed to the frame so that the arm inclines downwardly and rearwardly therefrom, a vertical plate on the other end of the arm having its upper edge arcuate and provided with teeth inclining to one side thereof, a bell crank lever pivotally mounted on the plate on said side thereof, so that one arm engages with the teeth, a bar, spring means for mounting the bar on the plate to engage the lever to normally hold it engaged with the teeth, and a chain engaged with the lever and with the fender, whereby the swinging of the lever will cause the raising and lowering of the fender.

In testimony whereof I affix my signature.

PETE TOWNS.